United States Patent [19]

Monsarrat et al.

[11] Patent Number: 4,744,214
[45] Date of Patent: May 17, 1988

[54] ENGINE MODULARITY

[75] Inventors: William G. Monsarrat, Willimantic; Robert F. Brodell, Marlborough, both of Conn.

[73] Assignee: United Technologies Corporation, Hartford, Conn.

[21] Appl. No.: 67,339

[22] Filed: Jun. 29, 1987

[51] Int. Cl.⁴ ............................................. F02K 3/02
[52] U.S. Cl. ................. 60/226.1; 60/39.161; 416/171; 416/170 R; 415/143
[58] Field of Search ............... 60/226.1, 39.161, 39.31, 60/39.32; 416/171, 170 R; 415/143, 122 R

[56] References Cited

U.S. PATENT DOCUMENTS

| 2,837,892 | 6/1958 | Van Acker | 60/39.161 |
|---|---|---|---|
| 2,933,893 | 4/1960 | Blyth et al. | 60/39.161 |
| 2,971,334 | 2/1961 | Carlson | 60/39.16 |
| 3,088,278 | 5/1963 | Franz | 60/39.16 |
| 3,150,820 | 9/1964 | Jekat et al. | |
| 3,152,443 | 10/1964 | Newland | 60/39.31 |
| 3,169,749 | 2/1965 | Harris | |
| 3,352,114 | 11/1967 | Wilde et al. | 60/39.31 |
| 3,358,440 | 12/1967 | Freid | 60/39.16 |
| 3,390,527 | 7/1968 | Decker et al. | 60/226 |
| 3,520,134 | 7/1970 | Cripe et al. | 60/39.31 |
| 3,720,060 | 3/1973 | Davies et al. | 60/39.31 |
| 3,761,205 | 9/1973 | Cronstedt | 417/407 |
| 3,823,553 | 7/1974 | Smith | 60/39.31 |
| 3,842,595 | 10/1974 | Smith et al. | 60/39.36 |
| 3,861,139 | 1/1975 | Jones | 60/226.1 |
| 4,030,288 | 6/1977 | Davis et al. | 60/39.31 |
| 4,193,741 | 3/1980 | Briggs | 416/170 R |
| 4,201,513 | 5/1980 | Sales | 416/170 R |
| 4,418,528 | 12/1983 | Pellow | 60/39.31 |
| 4,456,425 | 6/1984 | McCarty et al. | 415/122 R |
| 4,488,399 | 12/1984 | Robey et al. | 416/171 |

FOREIGN PATENT DOCUMENTS 1300352 7/1969 Fed. Rep. of Germany ... 416/170 R

Primary Examiner—Louis J. Casaregola
Assistant Examiner—Donald E. Stout
Attorney, Agent, or Firm—Charles A. Warren

[57] ABSTRACT

The low pressure compressor and fan together with the intermediate case are removable as a unit from the core engine by removal of the nose cone and a stub shaft at the front of the low pressure turbine shaft and at the ID of the fan hub (50) to provide access to attachment bolts at the inner portion of the intermediate case which holds the bearing for the high pressure rotor in position within the intermediate case after assembly of the engine.

8 Claims, 2 Drawing Sheets

ENGINE MODULARITY

DESCRIPTION

1. Technical Field

A multiple rotor turbine engine with a through strut intermediate case between the low and high pressure compressors can be split into two large modules. The front module consists of the fan, low pressure compressor and the intermediate case and is separable from the core engine module at the front of the high pressure compressor. This invention makes possible the separation of these two modules without extensive disassembly by providing better access to previously inaccessible attaching elements.

2. Background Art

It is desirable to separate the engine into modules for ease of repair and for shipment. If the modules are readily separable there is significant saving of time and expense for handling, installation and disassembly for shipment or repair. Modularity of engines is not in itself a new concept but extensive disassembly required to separate the modules prevented realizing full advantage and benefits from the modularity.

Further, the through strut concept for the intermediate case in the multirotor engine has produced a simpler and lower cost engine but the difficulty of separating the modules between the intermediate case and the high pressure case has discouraged the use of this construction.

DISCLOSURE OF INVENTION

One feature of the present invention is an arrangement for access to the bearing housing bolts at the intermediate case from the front of the engine thereby permitting separation of the modules at this location. Access to the attaching elements that hold the engine module together permits the separation with a minimum of disassembly of either module.

Another feature is the easy removal of the nose cone for access to the internal shaft structure to permit the necessary disassembly.

Another feature is a removable stub shaft forming a drive connection between the low pressure turbine shaft and the low pressure compressor to permit access to the internal portions of the engine for disassembly.

According to the invention the drive for the fan and low pressure compressor rotor is provided from the low pressure turbine through the low pressure shaft extending forward from the turbine, and a stub shaft that is connected to the forward end of the low pressure turbine shaft and extends forward to be splined to the supporting ring for the fan. A clamping ring permits removal of the stub shaft at the front end of the engine. Access is then possible to the bolts holding the bearing structure within the intermediate case. When these bolts are undone, the front module is separable as a unit from the core engine. The nose cone is built so that it can be removed from its supports on the fan blade ring for access to the stub shaft. When the stub shaft is removed, the fan and low pressure compressor rotor remain properly supported within the surrounding fan and low pressure compressor cases. The bearing remains on the end of the high pressure rotor shaft and stays in place when the first module is removed. The bearing structure is so arranged that the front module can be replaced over the bearing and then be attached thereto in reassembly.

Other features and advantages will be apparent from the specification and claims and from the accompanying drawings which illustrate an embodiment of the invention.

BEST MODE FOR CARRYING OUT THE INVENTION

Figure 1:
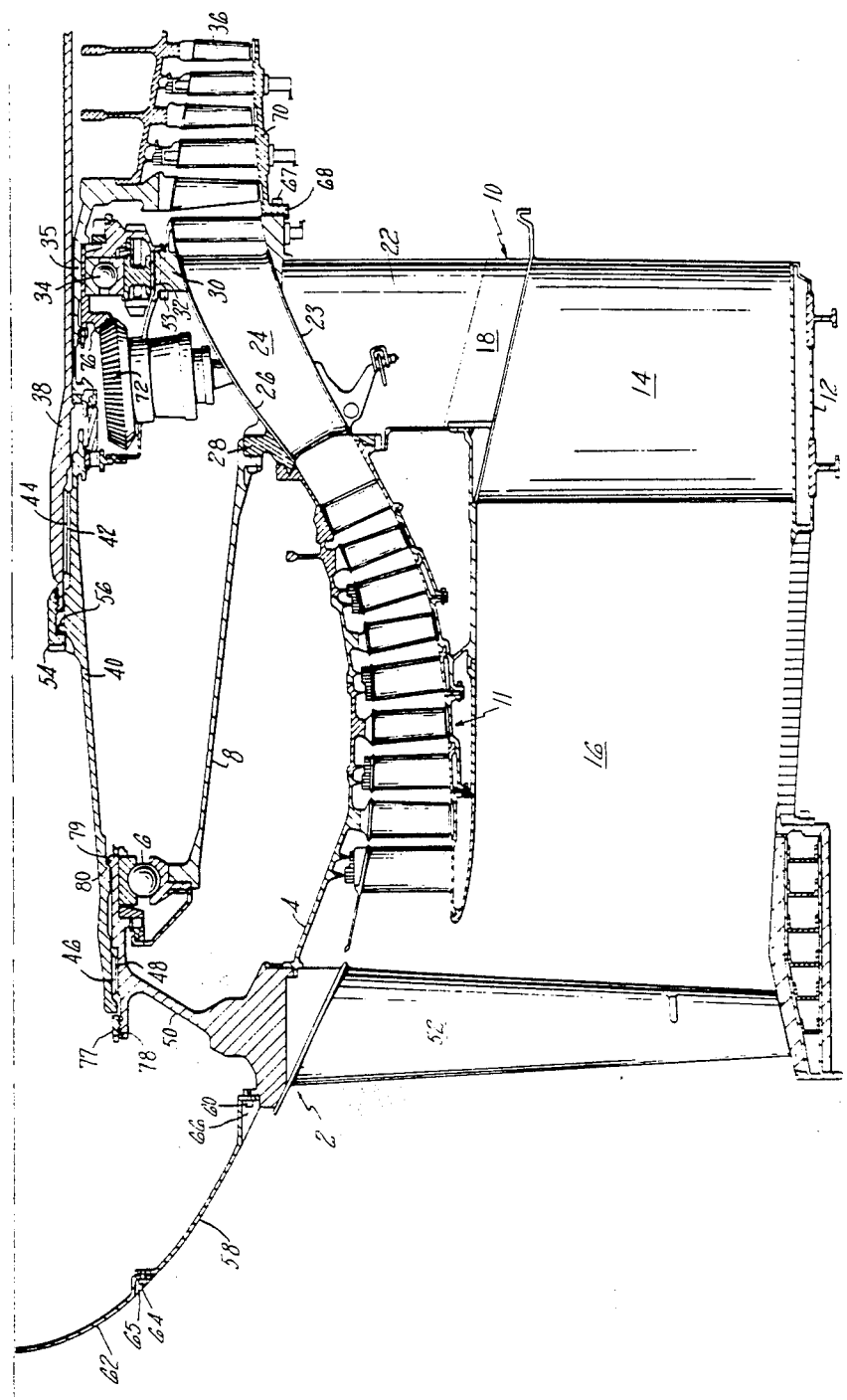
FIG. 1 is a sectional view of the low pressure compressor and fan.
Figure 2:
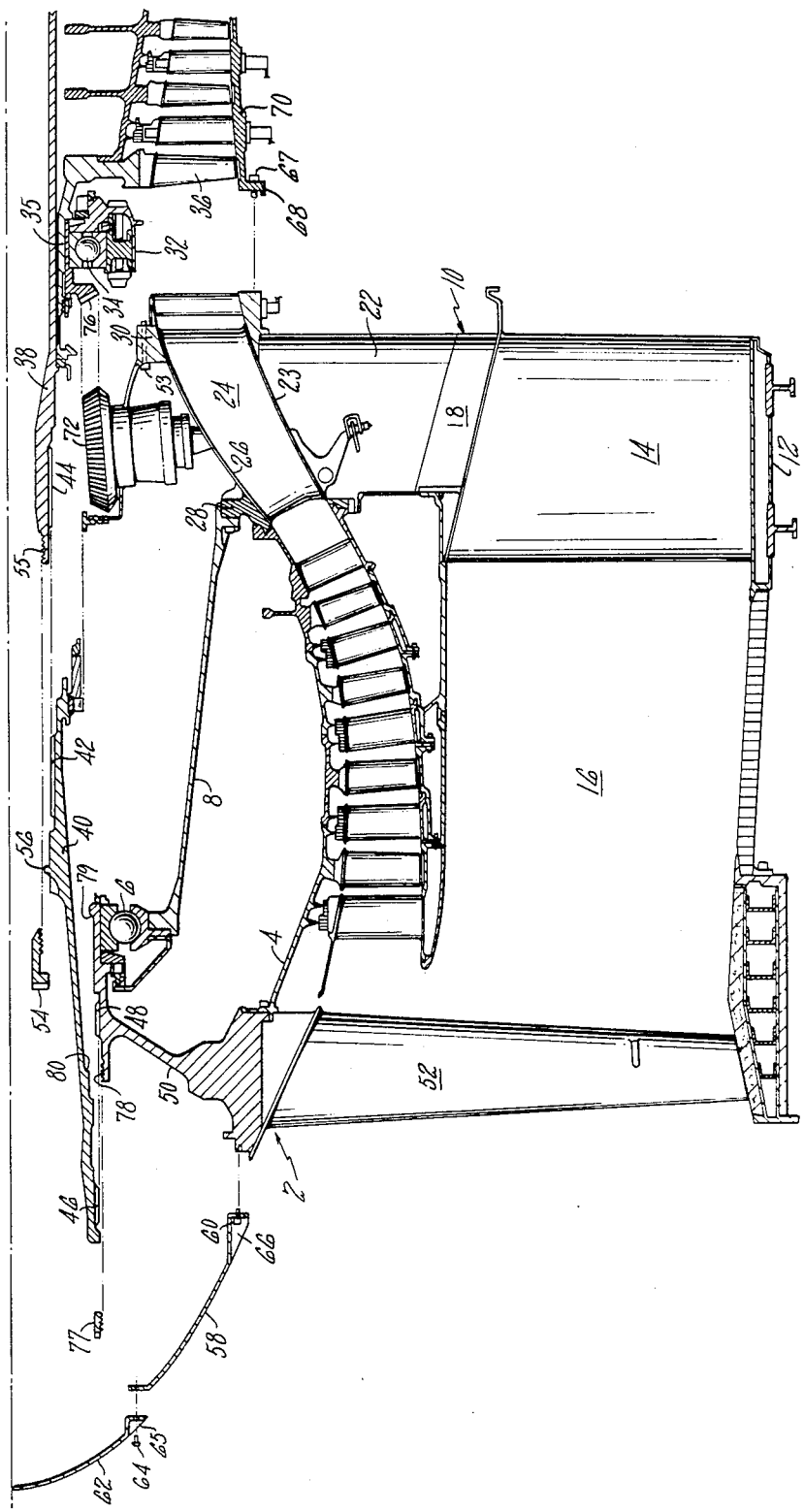
FIG. 2 is a sectional view similar to FIG. 1 but with the parts disassembled to show the separation of the modules.

The invention is shown in a two-rotor fan engine in which the fan 2 is mounted at the forward end of the multistage low pressure compressor rotor 4. They are both supported by a bearing 6 mounted in the forward end of a support 8 bolted to and extending forwardly from the through strut intermediate case 10. The low pressure compressor casing 11 surrounds the rotor. This case has an outer ring 12 with inwardly extending vanes 14 crossing the fan duct 16. The inner end of the vanes 14 engage an inner ring 18 forming a part of the inner wall of the fan duct. Inwardly of ring 18, the strut has radial legs 22 terminating in an outer ring 23 forming a part of the outer wall of the airflow duct for the turbine engine. Vane shaped struts 24 extend inwardly across the gas path from the outer ring 23 to an inner ring 26 forming a part of the inner wall of the gas path. At the forward end of the ring 26 is a flange 28 to which the support 8 is secured. Near the rearward edge of the ring 26 is another annular flange 30, the inner surface of which is cylindrical to fit slidably over an outer ring 32 on the bearing 34 that supports the forward end of the high pressure rotor shaft 35 on which the high pressure compressor rotor disks and blades 36 are mounted. The sliding fit permits the intermediate case to be moved axially over bearing 34 in assembly or disassembly of the low pressure module from the remainder of the engine.

The low pressure rotor shaft 38 extends forwardly from the low pressure turbine, not shown, and is connected to the low pressure compressor rotor and fan by a stub shaft 40. This shaft has internal splines 42 near its rearward end to engage with external splines 44 on the shaft 38. At its forward end, the stub shaft 40 has external splines 46 to engage with internal splines 48 on the fan disk 50 on which the fan blades 52 are mounted and to which the low pressure compressor rotor 4 is secured. A threaded clamping ring 77 on the end of the fan disk 50 engages the end of the stub shaft and secures it in position within the fan disk. This threaded ring is removable from the end of the engine as will be pointed out later. The fan disk forms a part of the low pressure compressor rotor as will be apparent.

When the low pressure module which includes the fan, the low pressure compressor and the intermediate case 10 are assembled in the position of FIG. 1 and the bolts 53 which secure the outer ring 32 within the flange 30 have been placed in position from the front end of the engine, the stub shaft 40 is then placed in assembled position with the splines 42 and 46 on the stub shaft 40 engaging the cooperating splines 44 and 48, respectively. The stub shaft is capable of being inserted from the front of the engine as will be apparent. The stub shaft is then locked in position by a threaded clamping ring 54, the clamping ring engaging threads 55 on the end of the low pressure shaft 38. The clamping ring holds a flange 56 on the stub shaft 40 against the end of the low pressure shaft 38. The low pressure compressor rotor 2 is then locked to stub shaft 40 by a threaded clamping ring 77, the clamping ring engaging threads 78 on the fan disk 50. The clamping ring 77 holds a shoulder 79 on the fan disk 50 against a shoulder 80 on the stub shaft 40.

When assembly of the low pressure compressor 2, stub shaft 40, and the low pressure turbine shaft 38 is complete, the rearward ring 58 of the nose cone is bolted to the fan disk 50 by bolts 60 and a cone element 62 is then bolted to the ring 58 by bolts 64. Access to these bolts is possible by recesses 65 and 66 as shown. The assembly is completed by a ring of bolts 67 that hold a flange 68 on the high pressure compressor case 70 against the intermediate case 10. Additional rings of bolts not shown by which the inner and outer duct walls, not shown, of the fan air duct are also attached. These rings of bolts are clearly accessible from external of the core engine which begins with the high pressure compressor case and extends rearwardly therefrom.

When separating the modules in preparation for overhaul or for shipment a reverse procedure is followed. After removing the rows of bolts 60 and 64 the nose cone elements 62 and 58 are removed for access to the stub shaft 40. The clamping rings 77 and 54 are undone and removed, and the stub shaft 40 is removed by pulling forward from within the fan disk 50. This is easily done once the nose cone has been removed. The bolts 53 are now accessible from the front of the engine through the space opened up by removal of the stub shaft and inwardly of the support 8. Once the bolts 53 and bolts 67 joining intermediate case 10 to the high pressure case 70 are removed, the front module is removable by pulling the front module forward from the core engine. The ring 30 slips forward from the outer ring 32 and once the module clears the end of the shaft 38 it can be moved wherever desired. It will be obvious that the bevel gear 72 disengages from the ring gear 76 on the end of the high pressure rotor 35. This gear 72 is on the inner end of a power takeoff device, the shaft of which is not shown, extends outwardly through the intermediate case 10.

It should be understood that the invention is not limited to the particular embodiments shown and described herein, but that various changes and modifications may be made without departing from the spirit and scope of this novel concept as defined by the following claims.

We claim:

1. In a turbine engine:
   a low pressure compressor casing,
   a low pressure rotor within the casing,
   an intermediate stout attached to the downstream end of said casing and having a bearing support structure extending forwardly from the strut within the casing and rotor,
   a bearing on said support for said low pressure rotor,
   a high pressure compressor rotor downstream of the strut,
   a bearing structure at the inner portion of the strut to support the high pressure rotor within this strut, said bearing having an axially slidable connection with the strut,
   a low pressure shaft within the high pressure compressor rotor and extending forwardly therefrom,
   a stub shaft having a splined connection with the low pressure shaft and with the low pressure rotor adjacent to its forward end to provide for axial assembly of the stub shaft within the engine,
   means for removably securing said stub shaft to said low pressure shaft at the forward end of said low pressure shaft, said securing means being accessible within the stub shaft, and
   securing bolts to hold said bearing structure axially within the strut, said bolts being accessible through the low pressure rotor when the stub shaft is removed from within the compressor.

2. A turbine engine as in claim 1 in which said bearing structure has a cylindrical outer surface and said intermediate strut has an inner cylindrical surface cooperating therewith for axial sliding movement of the strut over the bearing structure and cooperating flanges on said structure and said strut to receive the bolts for securing the bearing structure within the strut.

3. A turbine engine as in claim 1 in which the securing means is a threaded ring engaging with threads on the inner low pressure shaft with said ring being shouldered to hold the stub shaft against the end of the low pressure shaft.

4. A turbine engine as in claim 1 in which the low pressure compressor rotor includes a fan at its forward end and this fan has a supporting disk to which the rest of the low compressor rotor is secured and this disk has internal splines thereon to engage with cooperating splines on the stub shaft.

5. A turbine engine as in claim 4 in which there is a threaded ring on the forward end of the fan disk to hold the stub shaft in position therein.

6. A turbine engine as in claim 4 in which the cooperating splines on the stub shaft and the low pressure shaft are internal splines on the stub shaft and external splines on the low pressure shaft and the cooperating splines at the forward end of the stub shaft are external on the stub shaft and internal on the low pressure compressor rotor.

7. A turbine engine as in claim 4 in which the cooperating splines on the stub shaft and the low pressure compressor rotor are internal on the rotor and external on the stub shaft.

8. A turbine engine as in claim 7 in which there is a clamping ring at the end of the fan disk and engaging the end of the stub shaft to hold the fan disk on the stub shaft.

* * * * *